R. W. AITKEN.
Balanced-Valve.

No. 197,076. Patented Nov. 13, 1877.

Witnesses: John Smith, H. K. Jones

Robert W. Aitken, Inventor
by Wilhelm & Bonner, Attorneys

UNITED STATES PATENT OFFICE.

ROBERT W. AITKEN, OF BUFFALO, NEW YORK, ASSIGNOR TO ROBERT DUNBAR AND GEORGE H. DUNBAR, OF SAME PLACE.

IMPROVEMENT IN BALANCED VALVES.

Specification forming part of Letters Patent No. 197,076, dated November 13, 1877; application filed October 22, 1877.

*To all whom it may concern:*

Be it known that I, ROBERT W. AITKEN, of the city of Buffalo, in the county of Erie and State of New York, have invented a new and useful Improvement in Valves for Steam-Engines, of which the following is a specification, reference being had to the accompanying drawings.

My invention relates more particularly to a balanced slide-valve composed of two similar parts sliding on two seats or face-plates, and provided with two hollow sleeves, forming the cavity of the valve, and made capable of telescopic adjustment, so as to enable the two parts of the valve to run in steam-tight contact with the two face-plates of the valve-chest.

My invention consists of a packing of peculiar construction interposed between the two hollow sleeves so as to form a steam-tight joint, while permitting the sleeves to slide one upon the other as the two parts of the valve adjust themselves to the face-plates.

Figure 1:
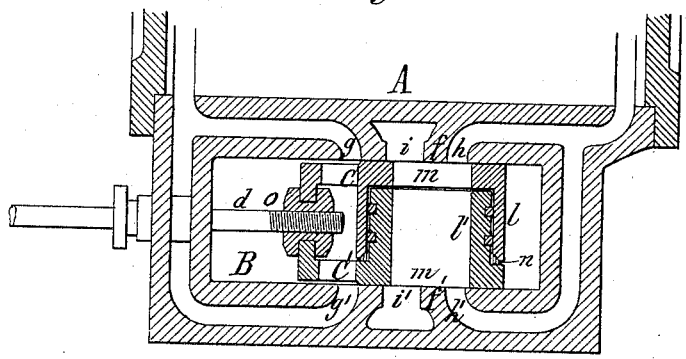
Figure 2:
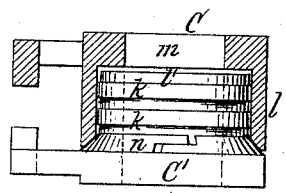
Figure 3:
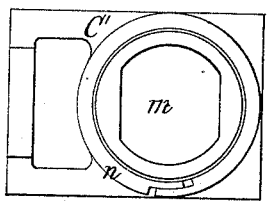

In the accompanying drawings, Figure 1 is a longitudinal section through a valve-chest provided with my improved valve. Fig. 2 is a partly sectional view of the valve. Fig. 3 is a plan view of one-half of the valve; and Fig. 4, a sectional view of the valve, showing a modified arrangement of the packing.

Like letters refer to like parts in each of the figures.

A represents the cylinder of a steam-engine, and B the valve-chest thereof. C C' are two slide-valves, arranged within the chest B, on opposite sides of the valve-stem $d$, and in contact with two face-plates, $f f'$, each of which is provided with two steam-ports, $g h g' h'$, and intermediate exhaust-ports $i i'$, respectively. The steam-ports $g' h'$ are connected with the ports $g h$, respectively, as clearly shown in Fig. 1. The two slide-valves C C' are provided, respectively, with hollow sleeves or collars, $l l'$, fitting snugly one into the other, so that the two valves C C' are enabled to adjust themselves to the face-plates $f f'$ by a slight telescopic movement of the sleeves $l l'$. Each of the valves C C' is provided with an opening, $m$, leading from the space or chamber within the sleeves $l l'$ to the exhaust-ports $i i'$.

$k$ represents packing-rings of any suitable construction, arranged on the contiguous sides of the sleeves $l l'$. $n$ is a beveled packing-ring resting against the base of the sleeve $l'$, as in Figs. 1 and 2, and cut or split, as shown in Figs. 2 and 3, so as to be capable of expanding and contracting.

The end of the sleeve $l$, Figs. 1 and 2, is beveled to correspond with the bevel of the ring $n$, so that when the two valves C C' are pressed together, the beveled end of the sleeve $l$ will compress the packing-ring $n$, so as to form a steam-tight joint between the end of the sleeve $l$ and the base of the sleeve $l'$.

When the two valves C C' are arranged between the two face-plates $f f'$, the packing-ring $n$ is compressed. As the two valves C C' and sleeves $l l'$ separate slightly in adjusting themselves to the face-plates $f f'$, the elasticity of the packing-ring $n$, which is constructed of suitable metal or other suitable material, enables the ring $n$ to expand; and, owing to the beveled form of the ring, and of the end of the sleeve $l$, a steam-tight joint is maintained between the parts.

The valve-stem $d$ is provided with an adjustable bearing-piece, $o$, connecting with the two valves C C', by means of two ribs or feathers engaging in corresponding recesses of the bearing-piece.

When the slide-valve is constructed as represented in Figs. 1, 2, and 3, the fresh steam is designed to be admitted to the valve-chest, whence it is admitted alternately to the steam-ports $g g'$ and $h h'$, and, after passing through the cylinder, is exhausted into the ports $i i'$.

If preferred, however, the fresh steam may be admitted to the central ports $i i'$, whence it passes into the cavity of the valve, and is then admitted alternately to the steam-ports $g g' h h'$, while the exhaust-steam escapes from the cylinder into the valve-chest, from which it is discharged in any suitable manner.

Figure 4:
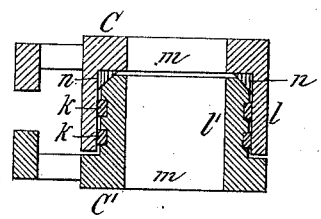

When the fresh steam is admitted to the interior of the sleeves $l l'$, the beveled packing-ring $n$ is preferably arranged between the beveled end of the inner sleeve $l'$, Fig. 4, and the base of the outer sleeve $l$, Fig. 4.

When the fresh steam is admitted to the valve-chest, the valves C C' are relieved from the steam-pressure in proportion to the space which the sleeves $l\ l'$ occupy on their surface. When the fresh steam is admitted to the cavity of the valve, the steam-pressure exerted upon each valve $C\ C'$ is proportionate to the small surfaces exposed around the openings $m$ within the sleeves $l\ l'$. In either case the surfaces exposed to the action of the steam are sufficiently large to cause a tight fit of the valves against the face-plates $f\ f'$, while the steam-pressure exerted upon the valves is so much smaller than in ordinary valves that all excessive wear and friction are avoided.

I claim as my invention—

The combination, with the slide-valves $C\ C'$, provided with overlapping sleeves $l\ l'$, capable of telescopic adjustment, of the beveled elastic packing-ring $n$, interposed between the beveled end of one sleeve and the base of the other sleeve, for forming a steam-tight joint, substantially as hereinbefore set forth.

R. W. AITKEN.

Witnesses:
 EDWARD WILHELM,
 JNO. J. BONNER.